United States Patent [19]
Iizuka et al.

[11] Patent Number: 4,745,167
[45] Date of Patent: May 17, 1988

[54] POLYARYLENE SULFIDE PREPARATION IN TITANIUM REACTION VESSEL WITH TWO DISTINCT TEMPERATURE RANGES

[75] Inventors: Yo Iizuka; Takao Iwasaki; Takayuki Katto; Zenya Shiiki, all of Iwaki, Japan

[73] Assignee: Kureha Kagaku Kogyo Kabushiki Kaisha, Tokyo, Japan

[21] Appl. No.: 941,209

[22] Filed: Dec. 12, 1986

[30] Foreign Application Priority Data

Dec. 18, 1985 [JP] Japan ................................ 60-285243

[51] Int. Cl.$^4$ ............................................. C08G 75/16
[52] U.S. Cl. ..................... 526/262; 528/86; 528/206; 528/226; 528/388
[58] Field of Search .................... 526/62; 528/388, 86, 528/206, 226

[56] References Cited

U.S. PATENT DOCUMENTS 3,868,352  2/1975  Rich ...................................... 526/62

Primary Examiner—Harold D. Anderson
Attorney, Agent, or Firm—Wenderoth, Lind & Ponack

[57] ABSTRACT

A process for the preparation of a high-molecular-weight polyarylene sulfide, which comprises subjecting an alkali metal sulfide such as sodium sulfide and a dihalo aromatic compound such as dichlorobenzene to dehalogenation sulfidation reaction in an organic amide solvent, wherein at least a part of the reaction is carried out in a reaction vessel in which at least the portion which the reaction liquid contacts is made of titanium, through at least the following two steps: (1) the step of carrying out the reaction at a temperature of 180° to 235° C. in the presence of water in an amount of 2.4 to 10 moles per mole of the alkali metal sulfide so that the conversion of the dihalo aromatic compound is at least 50% and the melt viscosity of the formed polyarylene sulfide does not exceed 500 P, and (2) the step of elevating the temperature to 245° to 290° C. in the presence of water in an amount of 2.5 to 10 moles per mole of the alkali metal sulfide with or without the addition of water to the reaction system and carrying out the reaction. The titanium reaction vessel is used for at least the step (1) and, preferably, for both the steps (1) and (2). The two-step reaction is advantageous in producing high molecular weight polyarylene sulfide.

12 Claims, No Drawings

POLYARYLENE SULFIDE PREPARATION IN TITANIUM REACTION VESSEL WITH TWO DISTINCT TEMPERATURE RANGES

BACKGROUND OF THE INVENTION

1. Field of the Art

The present invention relates to a process for the production of a polyarylene sulfide (hereinafter referred to as "PAS"). More particularly, the present invention relates to a novel process for the production of a high-molecular-weight linear PAS having a melt viscosity of at least 1,000 poises (P) at low cost without using a crosslinking agent or an organic acid salt.

In recent years, thermoplastic resins having increasingly high heat resistance have been sought as materials for the production of electric equipment parts and automobile parts.

PAS has properties satisfying this requirement, but a product having a sufficiently high molecular weight cannot be obtained. Moreover, PAS represented by polyphenylene sulfide, has been problematic in that it is very difficult to use to obtain fibers and films for which high strength is required and molded articles for which high impact strength is required.

The present invention provides a process in which this difficulty is overcome and PAS having a remarkably high molecular weight is prepared at low cost.

2. Description of the Prior Art

As a typical example of the process for the production of PAS, a process in which a dihalo aromatic compound such as dichlorobenzene is reacted with sodium sulfide in an organic amide solvent such as N-methylpyrrolidone, as disclosed in Japanese Patent Publication No. 3368/70 can be mentioned. PAS prepared according to this process has a low molecular weight and a low melt viscosity, and it is therefore difficult to form a film, a sheet, a fiber or the like from this PAS.

Accordingly, various improvements of this process for obtaining PAS having a high polymerization degree have been proposed. As a most typical example, there can be mentioned a process in which an alkali metal carboxylate is used as a polymerization catalyst in the above-mentioned reaction, as disclosed in Japanese Patent Publication No. 12240/77. According to this process, it is taught that the polymerization catalyst should be used at least in an amount equimolar to the amount of the alkali metal sulfide. Furthermore, according to this process, in order to obtain PAS having a high polymerization degree, it is necessary that an expensive polymerization catalyst such as lithium acetate or sodium benzoate be used in a large amount, whereby the manufacturing cost of PAS is increased, and the process is disadvantageous from the industrial viewpoint. Moreover, this process involves the risk of environmental pollution because large quantities of organic acids are contained in waste water left after recovery of PAS from the polymerization reaction mixture, and large expenses are required for eliminating this risk. Therefore, it is considered that this process is disadvantageous from the economical viewpoint.

As another process for preparing PAS having a high polymerization degree, there has been proposed a process in which a polyhalo aromatic compound having a functionality of at least 3, such as trichlorobenzene, is added as a crosslinking agent or branching agent during the polymerization or at the terminal stage of the polymerization (see, for example, Japanese Patent Application Laid-Open Specification No. 136100/78). According to this process, PAS having apparently a high molecular weight, for example, a melt viscosity of 20,000 P or more can be prepared, but this PAS has poor the spinnability or stretchability property because this PAS is a highly crosslinked or branched polymer. Accordingly, it is difficult to form this PAS into a film or fiber, or even if a shaped article is obtained, since the molecular chain is short in principle, the shaped article is mechanically very brittle.

Under with this background, we carried out research on the polymerization mechanism in the simple polymerization system between an alkali metal sulfide and a dihalo aromatic compound with a view to developing a process for preparing linear PAS having a high melt viscosity at a low cost without using a polymerization catalyst such as an alkali metal carboxylate. As a result, we have found that if the polymerization conditions, especially the amount of water present in the system and the polymerization temperature, conducted in the initial stage of the polymerization are made considerably different from those used in the latter stage, linear PAS having a high molecular weight corresponding to a melt viscosity of 1,000 to 8,000 P can be produced without using an assistant. We proposed this process in Japanese Patent Application No. 126725/84.

Not only in the conventional polymerization processes but also in the process proposed in Japanese Patent Application No. 126725/84, in the case of an ordinary reaction vessel material, in order to obtain a PAS having a melt viscosity of at least 1,000, it is necessary to control the amount of water present in the system in the initial stage of the polymerization within a relatively narrow range of 0.5 to 2.4 moles per mole of the alkali metal sulfide. Furthermore, since the alkali metal sulfide industrially available is in the form of a trihydrate, a pentahydrate or a nonahydrate, that is, a salt containing a large amount of water, it is necessary to strictly control the effective water content by removing a large amount of excessive water before initiation of the polymerization.

SUMMARY OF THE INVENTION

We carried out research with a view to eliminating or moderating the trouble, energy, equipment and time required for performing this dehydration step in the process proposed in Japanese Patent Application No. 126725/84. As a result, it was found, surprisingly, that if a reaction vessel having a liquid-contacting portion composed of titanium is used, even when the amount of water present in the system is considerably large in the initial stage of the polymerization, high-molecular-weight PAS having a melt viscosity of at least 1,000 P can be easily obtained. We have now developed the present invention on the basis of this finding.

More specifically, in accordance with the present invention, there is provided a process for the preparation of a polyarylene sulfide, which comprises subjecting an alkali metal sulfide and a dihalo aromatic compound to dehalogenation/sulfidation in an organic amide solvent, wherein the reaction is carried out by using a reaction vessel in which at least a portion which the reaction liquid contacts is composed of titanium through at least the following two steps: (1) the step of carrying out the reaction at a temperature of 180° to 235° C. in the presence of water in an amount of 2.4 to 10 moles per mole of alkali metal sulfide so that the conversion of the dihalo aromatic compound is at least 50% and the melt viscosity of the formed polyarylene sulfide does not exceed 500 P, and (2) the step of elevating the temperature to 245° to 290° C. in the presence of water in an amount of 2.5 to 10 moles per mole of the alkali metal sulfide by or without adding water to the reaction system and conducting the reaction.

In the case where a conventional reaction vessel composed of a material other than titanium, for example, a reaction vessel composed of stainless steel, is used, if the amount of water present in the system exceeds a certain level in the first stage of the polymerization, decomposition is caused either in the first stage or in the second stage of the polymerization. Therefore, in order to obtain PAS having a high molecular weight, it is necessary to control the amount of water present in the system within a narrow range. Moreover, since this narrow range of the amount of water is in the smaller amount region, when an alkali metal sulfide is used in the form of a commercially available hydrous salt, it is necessary to remove a large quantity of excessive water. In contrast, according to the present invention, by using a reaction vessel composed to titanium, the presence of water in a relatively large amount in the reaction system is permissible, and PAS having a high molecular weight can be obtained over a broad range of the amount of water present in the system.

Moreover, even if a commercially available solid alkali metal sulfide in the form of a hydrous salt (for example, a trihydrate or pentahydrate) is employed, the dehydration operation for adjusting the amount of water in the polymerization can be omitted or reduced, and therefore, the trouble, energy, equipment, labor and time required for this operation can be omitted or moderated, resulting in drastic reduction of the cost of the product.

DETAILED DESCRIPTION OF THE PREFERRED EMBODIMENTS

The present invention will now be described in detail.
Preparation of PAS

The process for the preparation of PAS according to the present invention is characterized in that the reaction between an alkali metal sulfide and a dihalo aromatic compound is carried out under specific conditions by using a reaction apparatus having a liquid-contacting portion composed of titanium.
Reaction Apparatus Having Liquid-Contacting Portion Composed of Titanium The first characteristic feature of the present invention resides in that a reaction apparatus having at least a liquid-contacting portion composed of titanium is used at least for the reaction of the step (1) or preferably both steps (1) and (2) which will be described in detail hereinbelow. That is, in the present invention, it is indispensable that at least a portion of a reactor of the reaction apparatus, which the reaction liquid always contacts, should be composed of titanium. By the expression "composed of titanium", it is meant that the liquid-contacting portion may be formed solely of titanium or formed of a metal material (for example, iron or stainless steel) covered with titanium. Of course, not only the liquid-contacting portion but also other portions, for example, pipes, or the entire reaction apparatus may be composed of titanium. If the reaction (inclusive of the partial dehydration) is carried out in this reaction apparatus constructed by using titanium, the decomposition by co-present water is remarkably reduced as compared with the case where a reaction apparatus of stainless steel or the like is used.

Alkali Metal Sulfide

Example of alkali metal sulfides suitable for use in the present invention are lithium sulfide, sodium sulfide, potassium sulfide, rubidium sulfide, cesium sulfide and mixtures thereof. The alkali metal sulfide may be used in the form of a hydrate, an aqueous mixture or an anhydride. Use of a salt having a water content lower than 10 moles per mole of the alkali metal sulfide is advantageous because the dehydration operation before the polymerization can be omitted.

Among the foregoing alkali metal sulfides, sodium sulfide is especially preferred from the industrial viewpoint because it is the cheapest.

A small amount of an alkali metal hydroxide may be used in combination with the alkali metal sulfide to remove aalkali metal disulfides or alkali metal thiosulfates, which may be present in minor amounts in the alkali metal sulfide, or to convert such impurities to sulfides.

As the commercial product having a low impurity content, crystalline sodium sulfide pentahydrate is most preferred among commercially available alkali metal sulfides. Although polymerization catalysts such as carboxylates are unnecessary for the method of this invention, the use of the catalysts in within the scope of this invention as far as the essential nature of the polmerization is not altered substantially.
Dihalo Aromatic Compound Dihalo aromatic compounds as disclosed in Japanese Patent Application Laid-Open Specification No. 22926/84 can be used as the dihalo aromatic compound in the present invention. Especially preferred compounds are p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide and 4,4'-dichlorodiphenyl ketone. A dihalo aromatic compound composed mainly of a paradihalobenzene represented by p-dichlorobenzene is especially preferred.

If dihalo aromatic compounds are appropriately selected and combined, a copolymer comprising at least two kinds of units can be obtained. For example, if p-dichlorobenzene is used in conjunction with m-dichlorobenzene or 4,4'-dichlorodiphenyl sulfone, a copolymer comprising units of

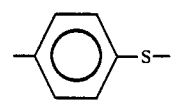

and units of

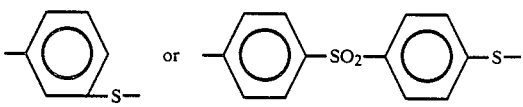

can be obtained. The copolymer may be either a random copolymer or a block copolymer.

Furthermore, although PAS according to the present invention is a polymer of a dihalo aromatic compound as described above, a monohalo compound (need not be limited to an aromatic compound) may be used in combination with the dihalo aromatic compund to form the terminal of the resulting polymer or adjust the polymerization or the molecular weight.

The present invention is characterized in that even if a crosslinking agent or a branching agent is not substantially added, substantially linear PAS having a high molecular weight can be obtained. However, even if the polymerization is carried out by adding a crosslinking agent (trihalobenzene or the like) in such a small amount as not degrading the processability or physical properties of the formed polymer, this feature is within the scope of the present invention.

Polymerization Solvent

Examples of the organic amide solvents, which include organic ureas, to be used for the polymerization reaction of the present invention are N-methylpyrrolidone (NMP), N-ethylpyrrolidone, N,N-dimethylformamide, N,N-dimethylacetamide, N-methyl-caprolactam, tetramethylurea, hexamethylphosphorotriamide and mixtures thereof. Among these solvents, N-methylpyrrolidone is especially preferred. It is preferable that the organic amide used as the polymerization solvent be a non-protonic compound.

It also is preferred that the organic amide solvent be used in an amount of 0.2 to 5 kg per mole of the alkali metal sulfide.

Polymerization

A second characteristic feature of the present invention, coming next to the use of a reaction apparatus composed of a titanium material, resides in that the polymerization is carried out in two stages.

(1) Definition

The polymerization of the present invention is carried out in at least two stages, that is, at least two steps, which are different with respect to the reaction temperature of the polymerization mixture and, if necessary, the amount of water present in the polymerization mixture. By the term "at least two steps" is meant that auxiliary steps may be added before, during or after the two steps, so long as the effects of the present invention, which are due to the two steps, can be realized.

(2) Polymerization of Initial Stage

In the fist step of the present invention, that is, the first stage of the polymerization, the reaction is carried out at a temperature of 180° to 235° C. in the polymerization mixture containing water in an amount of 2.4 to 10 moles per mole of the charged alkali metal sulfide so that the conversion of the dihalo aromatic compound in the polymerization mixture is at least 50 mole%, and the melt viscosity of the PAS fomred does not exceed 500 P (as pointed out hereinbefore, the melt viscosity referred to in the present invention is determined at 300° C. at a shearing speed of 200 sec$^{-1}$).

In carrying out the polymerization of the first stage, the alkali metal sulfide and dihalo aromatic compound are added to the organic amide solvent preferably in an inert gas atmosphere, and the temperature is elevated to a specific level to advance the reaction.

The amount of water present in the polymerization mixture is adjusted to a level higher than 2.4 and to 10 moles per mole of the charged alkali metal sulfide. It is especially preferred that the amount of water be higher than 2.4 and to 6 moles per mole of the charged alkali metal sulfide because PAS having a high molecular weight is readily obtained. Of course, even if the amount of water is at or less than 2.4 moles, good results can be obtained if the amount of water is at least 0.5 mole (see the prior invention proposed by us), but in this case, the characteristic benefits of the present invention using a reactor composed of titanium cannot be obtained. If the amount of water exceeds 10 moles per mole of the alkali metal sulfide, the polymerization speed is drastically reduced, and good results cannot be obtained. The amount of water present in the polymerization mixture is adjusted by carrying out dehydration before the reaction as in the conventional technique if the water content of the alkali metal sulfide is greater than the amount of water specified in the present invention, or by adding a necessary amount of water if the water content in the alkali metal sulfide is less than the amount of water specified in the present invention. However, in the present invention, since the amount of water present in the polymerization mixture is relatively large and within the broad range of higher than 2.4 up to 10 moles per mole of the alkali metal sulfide, an ordinarily commercially available hydrous salt of an alkali metal sulfide can be used directly, and the dehydration operation is not necessary. Even if the dehydration operation is carried out, the necessary amount of water to be removed is very small.

The polymerization of the initial stage is carried out at 180° to 235° C. If the polymerization temperature is too low, the polymerization speed will be too low, while if the temperature is higher than 235° C., the fomed PAS and the solvent will be readily decomposed, and only PAS having a very low melt viscosity will be obtained.

In order to obtain PAS having a high molecular weight, it is preferable that the dihalo aromatic compund be used in an amount of 0.9 to 1.1 moles, especially 0.98 to 1.05 moles, per mole of the alkali metal sulfide. If the amount used of the dihalo aromatic compound is less than 0.9 mole or greater than 1.1 moles per mole of the alkali metal sulfide, it will be difficult to obtain PAS having a high viscosity, which is suitable for processing.

The terminal point of the polymerization of the first stage, that is, the point of the changeover to the polymerization of the second stage from the polymerization of the first stage, is the point at which the conversion of the dihalo aromatic compound in the polymerization mixture is at least 50 mole%. If the conversion is lower than 50 mole%, undesirable reactions such as decomposition will take place in the following stage.

The conversion of the dihalo aromatic compound, referred to in the present invention, is one calculated according to the following formula.

(a) In the case where the dihalo aromatic compound (hereinafter referred to as "DHA") is added in a molar excess over the alkali metal sulfide, the following formula is adopted:

$$\text{Conversion} = \frac{\text{amount(moles) of } DHA \text{ charged} - \text{amount(moles) of } DHA \text{ left}}{\text{amount(moles) of } DHA \text{ charged} - \text{amount(moles of } DHA \text{ excessive}} \times 100$$

(b) In a case other than the above-mentioned case, the following formula is adopted:

$$\text{Conversion} = \frac{\text{amount(moles) of } DHA \text{ charged} - \text{amount(moles) of } DHA \text{ left}}{\text{amount(moles) of } DHA \text{ charged}} \times 100$$

At the point of the changeover to the polymerization of the second stage from the polymerization of the first stage, the melt viscosity of the PAS should be lower than 500 P. If the melt viscosity of PAS is lower than 500 P at this point, high-molecular-weight PAS having a melt viscosity of at least 1,000 P can be easily obtained. If the melt viscosity exceeds 500 P at this point, the polymerization activity will be reduced and decomposition of the polymerization mixture will be caused, whereby good results cannot be obtained.

(3) Polymerization of Second Stage

In the second step of the polymerization of the present invention, that is, in the polymerization of the latter stage, the temperature is elevated to 245° to 290° C. while the water content is kept at that of the polymerization of the first stage, or while water is added to the slurry formed in the polymerization of the first stage, so that the total amount of water present in the polymerization mixture is 2.5 to 10 moles per mole of the alkali metal sulfide, and in this state, the polymerization is continued. The polymerization of the second stage is preferred to be continued until the melt viscosity of PAS attains to at least 1,000 P from the view point of processability of the PAS obtained and of properties of the molds therefrom.

If the total amount of water present in the polymerization mixture is less than 2.5 moles or greater than 10 moles per mole of the alkali metal disulfide, the melt viscosity of formed PAS will be reduced. If the polymerization of the latter stage is carried out in a state wherein the total amount of water present in the polymerization mixture is 3.5 to 6.0 moles per mole of the alkali metal sulfide, PAS having a high melt viscosity can be easily obtained. If the polymerization temperature is lower than 245° C., only PAS having a low melt viscosity will be obtained. If the polymerization temperature exceeds 290° C., there will be the risk of decomposition of the PAS formed or the polymerization solvent. A polymerization temperature of 250° to 270° C. is especially preferred because PAS having a high melt viscosity is easily obtained.

In the present invention, the latter stage of the polymerization is not merely a step of fractionation or granulation of PAS formed in the first stage but is a step of drastically increasing the melt viscosity of PAS formed in the initial stage, being accompanied with incidental granulation of PAS. From the viewpoint of the granulation of PAS, polymerization is preferred to be continued until the viscosity of PAS increases to over 5 times, more preferably to over 10 times, that of the beginning of this stage. Accordingly, the polymerization time in the latter stage is determined from this viewpoint. More specifically, the polymerization time of the latter stage is about 0.5 to about 20 hours. If the polymerization time is too short, the melt viscosity of the PAS obtained will be low, while if the polymerization time is too long, decomposition will be caused in the polymerization mixture. It is preferable that the polymerization time be 1 to 15 hours, especially 3 to 10 hours.

The changeover to the polymerization of the latter stage from the polymerization of the former stage is accomplished by transferring the slurry obtained in the former stage to another reaction vessel (which preferably also has at least a liquid-contacting portion composed of titanium) and placing the slurry under the conditions for the polymerization of the latter stage, or by carrying out the polymerization of the latter stage in the same polymerization vessel as adopted for the polymerization of the former stage while changing the polymerization conditions. When water is added, it is preferable that it be added after the polymerization of the former stage but before elevation of the temperature to the level for the polymerization of the latter stage, during elevation of the temperature, or just after elevation of the temperature to the level for the polymerization of the latter stage. Especially good results are obtained when water is added before elevation of the temperature.

When the polymerization of the latter stage is carried out, a small amount of an alkali such as an alkali metal hydroxide or an alkaline earth metal hydroxide can be added to the polymerization mixture, whereby the stability of the polymerization mixture is increased in some cases. Furthermore, a salt such as an alkali metal carboxylate, an alkaline earth metal carboxylate, an alkali metal sulfonate, lithium chloride, lithium carbonate or potassium fluoride is permitted to be added, provided that the characteristics of the polymerization process of the present invention are not substantially impaired, although addition of such a salt is not particularly necessary in the present invention.

(4) Post Treatment

In the process of the present invention, the post treatment can be carried out according to customary procedures. More specifically, after completion of the polymerization of the latter stage, a post treatment comprising filtering the cooled product slurry directly or after dilution with water or the like, repeated water washing and filtration, and drying the obtained solid is carried out, whereby PAS is obtained.

PAS Formed

PAS obtained according to the process of the present invention has a high melt viscosity of at least 1,000 P and is substantially linear in structure. Accordingly, this PAS can be shaped very easily into a heat-resistant film, sheet, fiber, or other shapes. Moreover, this PAS can be formed into various formed articles by injection molding, extrusion, and rotational forming. Even if these formed articles are thick, cracking is not easily caused therein.

Furthermore, powdery fillers such as powders of calcium carbonate, calcium silicate, calcium sulfate, calcium phosphate, silica, alumina, silica-alumina, titania, carbon, silicon nitriae, talc, clay, mica, or glass, or a fibrous fillers such as filbers of carbon, glass, aramide, potassium titanate, calcium silicate, or calcium sulfate can be admixed singly or as a mixture thereof in the polymer of the present invention.

Moreover, at least one synthetic resin and/or at least one synthetic elastomer selected from polycarbonate, polyphenylene oxide, polysulfone, polyarylene, polyacetal, polyimide, polyamide, polyester, polyestersulfone, polyetheretherketone fluoropolymer, polyolefin, silicone or ABS can be mixed with the polymer of the present invention.

The present invention will now be described in detail with reference to the following examples.

EXAMPLE 1

(1) Polymerization of Initial Stage

A 3-liter autoclave made of titanium was charged with 1,500 g of N-methyl-2-pyrrolidone (NMP), 387.36 g of flaky $Na_2S$ containing 60.44% by weight of $Na_2S$ (3.00 moles as $Na_2S$ and 8.51 moles of $H_2O$), 449.85 g (3.06 moles) of p-dichlorobenzene (p-DCB) and 12 g of NaOH. The temperature was elevated to 220° C. with stirring in an atmosphere of $N_2$, and the reaction was carried out for 10 hours. The temperature was lowered to room temperature, and a small portion of a light yellow slurry was sampled. The amount of p-DCB left in the slurry was determined by gas chromatography. The conversion was calculated according to the above-mentioned formula (a). The conversion was found to be 94.0%.

The sampled slurry was subjected to suction filtration to remove the liquid portion. The solid was dispersed in a large amount of deionized water. The dispersion was subjected to suction filtration, and the thus obtained polymer was washed. The above procedure was repeated three times, and the solid was dried at 100° C. for 5 hours (in an air atmosphere) to obtain a powder of polyphenylene sulfide (PPS). The powder was melt-pressed at 320° C. for 30 seconds without preheating, and the melt viscosity ($\eta^*$) of the obtained press sheet was measured at 300° C. (preheating was conducted for 5 minutes) by a Koka type flow tester (supplied by Shimazu Seisakusho). The thus obtained value was extrapolated to a shearing speed of 200 $sec^{-1}$. It was found that the melt viscosity was 20 P.

(2) Polymerization of Second Stage

To the remaining slurry were added about 90 g of $H_2O$ (the amount of $H_2O$ in the slurry was about 4.5 moles per mole of $Na_2S$) and 3 g of NaOH. In an atomosphere of $N_2$, polymerization was carried out for 5 hours. The conversion of p-DCB was 98.0 mole%.

After cooling, by using a sieve having a mesh size of about 0.1 mm, NMP, PPS oligomer and other substances were separated from white granular PPS. The PPS thus obtained was washed repeatedly with deionized water and dried at 100° C. for 5 hours. The yield was 81%. The yield referred to herein means the ratio or the amount of the recovered polyphenylene sulfide to the amount of polyphenylene sulfide based on the supposition that all of the monomer was converted to polyphenylene sulfide having a high polymerization degree (theoretical amount). The melt viscosity measured according to the same method as adopted for the polymer obtained in the first stage was 5,000 P.

EXAMPLE 2

By using a 3-liter autoclave made of titanium, the polymerization of the first stage was carried out as in Example 1 except that the amount of p-DCB was changed to 454.26 g (3.09 moles). The conversion was 94.5% and the melt viscosity of the formed PPS was about 10 P.

White granular PPS was obtained by carrying out the polymerization of the second stage under the conditions as in Example 1 except that about 117 g of $H_2O$ was added (the amount of $H_2O$ in the slurry was about 5.0 moles per mole of charged $Na_2S$).

The conversion of p-DCB was 99.0%; the yield was 85%; and the melt viscosity was 4,000 P.

EXAMPLE 3

A 3-liter autoclave made of titanium was charged with 1,500 g of NMP, 508.9 g of $Na_2S$ pentahydrate crystal containing 46.00% by weight of $Na_2S$ (supplied by Sankyo Kasei) (3.00 moles as $Na_2S$ and 15.27 moles of $H_2O$), 454.26 g (3.09 moles) of p-DCB and 12 g of NaOH. In an atmosphere of $N_2$, the temperature was elevated to 200° C. with stirring, and this temperature was maintained for 2 days. Then, the temperature was elevated to 210° C., and the reaction was conducted at this temperature for 1 day. The temperature was then lowered to room temperature. A small amount of the slurry was sampled, and the conversion and the melt viscosity of PPS was determined in the same manner as described in Example 1. It was found that the conversion was 93.0 mole% and the melt viscosity was 5 P.

Then, 6 g of NaOH was added to the reaction liquid; the atmosphere was replaced by nitrogen; and the temperature was elevated to 260° C. The polymerization of the latter stage was carried out for 3 hours. In the same manner as described in Example 1, the post treatment was carried out to obtain white granular PPS. The conversion was 96.4%; the yield was 81.0%; and the melt viscosity was 1200 P.

COMPARATIVE EXAMPLE 1

By using 3-liter autoclave made of stainless steel (JIS designation SUS 316), the starting materials were charged and the reaction was carried out in the same manner as described in Example 3. After the slurry was cooled to room temperature, a small amount of the slurry (grey) was sampled, and the conversion of p-DCB and the melt viscosity of formed PPS were determined. It was found that the conversion was 92.0 mole% and the melt viscosity was lower than 5 P.

In the same manner as described in Example 3, after addition of 6 g of NaOH, the atmosphere was replaced by $N_2$, the temperature was elevated to 260° C., and the polymerization of the second stage was carried out for 3 hours. The post treatment was carried out in the same manner as described in Example 1 to obtain grey granular PPS.

The conversion was 99.0 mole%; the yield was 61%; and the melt viscosity was 90 P.

From the results of gas chromatography of the liquid component of the slurry obtained by the polymerization of the second stage, it was confirmed that a minute amount of thiophenol formed by decomposition of the polymerization mixture was present.

EXAMPLES 4 AND 5

A 3-liter autoclave made of titanium was charged with 1,000 g of NMP, 3.00 moles of $Na_2S$ pentahydrate used in Example 3 and 12 g of NaOH. The temperature was elevated to 155° C., and water was removed until the amount of water present in the charge was reduced to about 4 moles per mole of charged $Na_2S$ and about 3 moles per mole of charged $Na_2S$, respectively. Then, a solution of 3.09 moles of p-DCB in 500 g of NMP was added. The polymerization of the first stage and the polymerization of the second stage were carried out under the conditions shown in Table 1. The obtained results are shown in Table 1.

COMPARATIVE EXAMPLES 2 AND 3

Polymerization was carried out under the conditions in Examples 4 and 5 except that a 3-liter autoclave made of SUS 316 was used. The polymerization conditions and obtained results are shown in Table 1.

EXAMPLE 6

A 3-liter autoclave made of titanium was charged with $Na_2S$ pentahydrate as described above and 1,000 g of NMP, and the temperature was elevated to 204° C. to distill off a liquid containing 218.5 g of NMP, 212.6 g of $H_2O$ and 0.055 mole of $H_2S$. Then, the residual mixture was cooled to 110° C., and a solution of 441.6 g of p-DCB in 691 g of NMP and 70 g of $H_2O$ were added (the amount of water present in the mixture was about 2.5 moles per mole of charged Na$_2$S). In an atmosphere of N$_2$, the temperature was elevated to 210° C., and the reaction was carried out for 10 hours.

Then, 106 g of H$_2$O was added (the amount of water present in the reaction mixture was about 4.5 moles per mole of Na$_2$S). The temperature was elevated to 260° C., and the reaction was carried out for 3 hours.

The obtained results are shown in Table 1.

COMPARATIVE EXAMPLE 4

Polymerization was carried out in the manner described in Example 6 except that a 3-liter autoclave made of SUS 316 was used. The polymerization conditions and obtained results are shown in Table 1.

What is claimed is:

1. A process for the production of a high-molecular-weight polyarylene sulfide, wherein a reaction liquid comprising an alkali metal sulfide and a dihalo aromatic compound in an organic amide solvent is subjected to dehalogenation sulfidation reaction in a reaction vessel in the following two steps:

(1) the step of carrying out the reaction at a temperature of 180° to 235° C. in the presence of water in an amount higher than 2.4 and up to 10 moles per mole of the alkali metal sulfide so that the conversion of the dihalo aromatic compound is at least 50% and the melt viscosity of the polyarylene sulfide formed does not exceed 500 poises, and

TABLE 1(a)

| | | Polymerization of First Stage | | | | | |
|---|---|---|---|---|---|---|---|
| Run No. | Material of Reaction Apparatus | Amount (mole/mole) of water present*[1] | Temperature (°C.) | Time (hrs) | Conversion (mole %) | Melt viscosity (P) of the polymer formed $\eta^*_1$ | Color of slurry |
| Example 1 | Ti | 2.83 | 220 | 10 | 94.0 | 20 | light yellow |
| Example 2 | Ti | 2.83 | 220 | 10 | 94.5 | 10 | light yellow |
| Example 3 | Ti | 5.1 | 200 / 210 | 48 / 24 | 93.0 | <5 | light yellow |
| Comparative Example 1 | SUS316 | 5.1 | 200 / 210 | 48 / 24 | 92.0 | <5 | dark grey |
| Example 4 | Ti | 4.0 | 200 / 210 | 48 / 24 | 93.3 | 10 | light yellow |
| Comparative Example 2 | SUS316 | 4.0 | 200 / 210 | 48 / 24 | 93.0 | <5 | dark grey |
| Example 5 | Ti | 3.0 | 210 | 20 | 92.1 | 10 | light yellow |
| Comparative Example 3 | SUS316 | 3.0 | 210 | 20 | 90.9 | <5 | dark grey |
| Example 6 | Ti | 2.5 | 210 | 10 | 91.2 | 10 | light yellow |
| Comparative Example 4 | SUS | 2.5 | 210 | 10 | 90.0 | <5 | grey |

Note:
*[1] amount (moles) of H$_2$O per mole of charged Na$_2$S

TABLE 1(b)

| | Polymerization of Second Stage | | | | | | | |
|---|---|---|---|---|---|---|---|---|
| Run No. | Amount (mole/mole) of water present*[1] | Temperature (°C.) | Time (hrs) | Conversion (mole %) | Yield (%) | Melt viscosity (P) of the polymer formed $\eta^*_2[\eta^*_2/\eta^*_1]$*[2] | Color of formed polymer | Remarks |
| Example 1 | 4.5 | 260 | 5 | 98.0 | 81 | 5000 [250] | white | commercially available trihydrate |
| Example 2 | 5.0 | 260 | 5 | 99.0 | 85 | 4000 [400] | white | commercially available trihydrate |
| Example 3 | 5.1 | 260 | 3 | 96.4 | 81 | 1200 [>240] | white | commercially available pentahydrate |
| Comparative Example 1 | 5.1 | 260 | 3 | 99.0 | 61 | 90 | grey | commercially available pentahydrate |
| Example 4 | 4.0 | 260 | 3 | 98.5 | 82 | 1300 [130] | white | commercially available pentahydrate after adjustment of water content |
| Comparative Example 2 | 4.0 | 260 | 3 | 98.3 | 73 | 100 | grey | commercially available pentahydrate after adjustment of water content |
| Example 5 | 4.5 | 260 | 3 | 98.8 | 82 | 2100 [210] | white | commercially available pentahydrate after adjustment of water content |
| Comparative Example 3 | 4.5 | 260 | 3 | 98.0 | 77 | 230 | grey | commercially available pentahydrate after adjustment of water content |
| Example 6 | 4.5 | 260 | 3 | 98.5 | 83 | 4300 [450] | white | commercially available pentahydrate after adjustment of water content |
| Comparative Example 4 | 4.5 | 260 | 3 | 98.6 | 77 | 600 | light grey | commercially available pentahydrate after adjustment of water content |

*[2] [$\eta^*_2/\eta^*_1$] The rate of increase in the melt viscosity after the polymerization of the second stage (2) the step of elevating the temperature to 245° to 290° C. in the presence of water in an amount of 2.5 to 10 moles per mole of the alkali metal sulfide with or without the addition of water to the reaction system and wherein at least the portion of the reaction vessel which the reaction liquid contacts is made of titanium in at least step (1).

2. The process according to claim 1, wherein the the alkali metal sulfide contains water at less than 10 moles per mole of the alkali metal sulfide.

3. The process according to claim 1, wherein the alkali metal sulfide is sodium sulfide.

4. The process according to claim 1, wherein the dihalo aromatic compound is a p-dihalobenzene, a m-dihalobenzene or a mixture thereof.

5. The process according to claim 1, wherein the amount of the dihalo aromatic compound is 0.9 to 1.1 moles per mole of the alkali metal sulfide.

6. The process according to claim 1, wherein the organic amide solvent is N-methylpyrrolidone.

7. The process according to claim 1, wherein the temperature of the polymerization of the step (2) is 250° to 270° C.

8. The process according to claim 1, wherein the time of the polymerization of the step (2) is 0.5 to 20 hours.

9. The process according to claim 8, wherein the time of the polymerization of the step (2) is 1 to 15 hours.

10. The process according to claim 9, wherein the time of the polymerization of the step (2) is 3 to 10 hours.

11. The process according to claim 1, wherein the polymerization of the step (1) and the polymerization of the step (2) are carried out in the same polymerization vessel.

12. The process according to claim 1, wherein the polymerization of the step (2) is carried out in a polymerization vessel different from the polymerization vessel used for the polymerization of the step (1), and at least the liquid-contacting portion of the polymerization vessel for the polymerization of the step (1) is also made of titanium.

* * * * *